US010783545B2

(12) United States Patent
Swamidurai

(10) Patent No.: US 10,783,545 B2
(45) Date of Patent: Sep. 22, 2020

(54) REWARD POINT REDEMPTION FOR CRYPTOCURRENCY

(71) Applicant: American Express Travel Related Services Company. Inc., New York, NY (US)

(72) Inventor: Vasudevan Swamidurai, Phoenix, AZ (US)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 94 days.

(21) Appl. No.: 15/956,982

(22) Filed: Apr. 19, 2018

(65) Prior Publication Data
US 2019/0325473 A1 Oct. 24, 2019

(51) Int. Cl.
*G06Q 30/02* (2012.01)
*G06Q 20/06* (2012.01)
*G06Q 20/36* (2012.01)

(52) U.S. Cl.
CPC ....... *G06Q 30/0233* (2013.01); *G06Q 20/065* (2013.01); *G06Q 20/367* (2013.01); *G06Q 30/0215* (2013.01)

(58) Field of Classification Search
CPC .................................................... G06Q 30/02
See application file for complete search history.

(56) References Cited

U.S. PATENT DOCUMENTS

| 9,785,912 B2 | 10/2017 | Quezada |
| 2002/0178354 A1 | 11/2002 | Ogg |
| 2010/0042517 A1* | 2/2010 | Paintin .................. G06Q 30/02 705/30 |
| 2014/0108263 A1 | 4/2014 | Ortiz et al. |

(Continued)

FOREIGN PATENT DOCUMENTS

| WO | 20170136956 | 8/2017 |
| WO | 2018064645 | 4/2018 |

OTHER PUBLICATIONS

International Search Report and Written Opinion dated PCT/US2018/047640.

(Continued)

*Primary Examiner* — Vincent M Cao
(74) *Attorney, Agent, or Firm* — Thomas | Horstemeyer, LLP

(57) ABSTRACT

A system and method for the redemption of reward points for cryptocurrency is disclosed. The system may allow transaction account holders to redeem earned reward points for a selected cryptocurrency. The transaction account holders may establish a blockchain wallet to maintain and track the cryptocurrency. The system may interact with an exchange API of a cryptocurrency exchange platform to purchase the cryptocurrency for a blockchain wallet address associated with the blockchain wallet, or to initiate a transfer of pre-purchased cryptocurrency to the blockchain wallet. The system may provide additional authentication measures to ensure that the transaction is initiated by the transaction (Continued)

account holder and that the transaction account holder understands the potential risks of investing in cryptocurrencies.

20 Claims, 4 Drawing Sheets

(56) References Cited

U.S. PATENT DOCUMENTS

| | | | |
|---|---|---|---|
| 2015/0324789 A1* | 11/2015 | Dvorak | G06Q 20/3823 |
| | | | 705/67 |
| 2015/0365283 A1* | 12/2015 | Ronca | H04L 41/0816 |
| | | | 705/71 |
| 2016/0092988 A1* | 3/2016 | Letourneau | G06Q 40/06 |
| | | | 705/66 |
| 2016/0283941 A1 | 9/2016 | Andrade | |
| 2016/0292672 A1* | 10/2016 | Fay | G06Q 20/363 |
| 2016/0342977 A1 | 11/2016 | Lam | |
| 2017/0017936 A1 | 1/2017 | Bisikalo et al. | |
| 2017/0140408 A1 | 5/2017 | Wuehler | |
| 2017/0236143 A1 | 8/2017 | Code | |
| 2017/0286951 A1 | 10/2017 | Ignatchenko et al. | |
| 2018/0025442 A1* | 1/2018 | Isaacson | H04W 12/0609 |
| | | | 705/26.62 |
| 2018/0064645 A1 | 3/2018 | Greenspoon | |
| 2018/0089645 A1 | 3/2018 | McDonald et al. | |

OTHER PUBLICATIONS

International Search Report and Written Opinion dated Jun. 13, 2019 in No. PCT/US2019/022798.
International Search Report and Written Opinion dated Jun. 28, 2019 in No. PCT/US2019/26818.
Non-final Office Action dated Sep. 6, 2019 in U.S. Appl. No. 15/728,086.
Sastry Durvasula, et al., U.S. Appl. No. 15/728,086, filed Oct. 9, 2017, titled "Systems and Methods for Loyalty Point Distribution".
Vasudevan Swamidurai, U.S. Appl. No. 15/948,834, filed Apr. 9, 2018, titled "Reward Point Transfers Using Blockchain".
International Preliminary Report on Patentability in co-pending, related PCT Application No. PCT/US2019/0269818, dated Nov. 21, 2019.

\* cited by examiner

REWARD POINT REDEMPTION FOR CRYPTOCURRENCY

FIELD

This disclosure generally relates to reward points, and more particularly, to systems and methods for redeeming reward points for cryptocurrency.

BACKGROUND

Transaction account issuers often reward account holders for utilizing their transaction accounts. For example, transaction account issuers may provide points (e.g., loyalty points, membership points, reward points, etc.) corresponding to an amount spent utilizing a transaction account. The points may be used for travel, redeemed for cash, gift cards, or other items, and/or transferred to one or more rewards partners (e.g., loyalty programs hosted by airlines, hotels, etc.).

SUMMARY

A system, method, and computer readable medium (collectively, the "system") is disclosed for redeeming reward points for cryptocurrency. The system may receive, via a transaction network, a cryptocurrency redemption request comprising a user identifier, a reward points redemption amount, and a cryptocurrency type. The system may retrieve from a rewards database a user blockchain wallet address associated with the user identifier. The system may transmit to a cryptocurrency exchange API a cryptocurrency purchase request comprising the user blockchain wallet address. The system may receive from the cryptocurrency exchange API a transaction link in response to the cryptocurrency exchange API completing the cryptocurrency purchase request. The cryptocurrency exchange API may be configured to complete the cryptocurrency purchase request by writing transaction data to a blockchain. The transaction link may comprise a link to the transaction data on the blockchain comprising the transaction data of the completed cryptocurrency purchase request.

In various embodiments, the cryptocurrency purchase request may also comprise a fiat currency value based on the reward points redemption amount. The cryptocurrency exchange API may be configured to complete the cryptocurrency purchase request by exchanging the fiat currency value for a cryptocurrency amount.

In various embodiments, the cryptocurrency purchase request may also comprise a transaction network blockchain wallet address. The cryptocurrency exchange API may be configured to complete the cryptocurrency purchase request by transferring a pre-purchased cryptocurrency amount from the transaction network blockchain wallet address to the user blockchain wallet address, wherein the pre-purchased cryptocurrency amount is based on the reward points redemption amount.

In various embodiments, the system may also store the transaction link in the rewards database as proof of the completed cryptocurrency purchase request. The system may also transmit to a user terminal a user security prompt in response to receiving the cryptocurrency redemption request. The user security prompt may comprise a multi-factor authentication request and/or a cryptocurrency warning.

In various embodiments, the system may receive a cryptocurrency redemption registration request. The system may transmit to the user terminal a user identification data request comprising a prompt to input identity-based data. The system may authenticate a user identification data response by validating data received from the user terminal in response to the user identification data request. The system may receive from the user terminal the user blockchain wallet address to complete the cryptocurrency redemption registration request.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
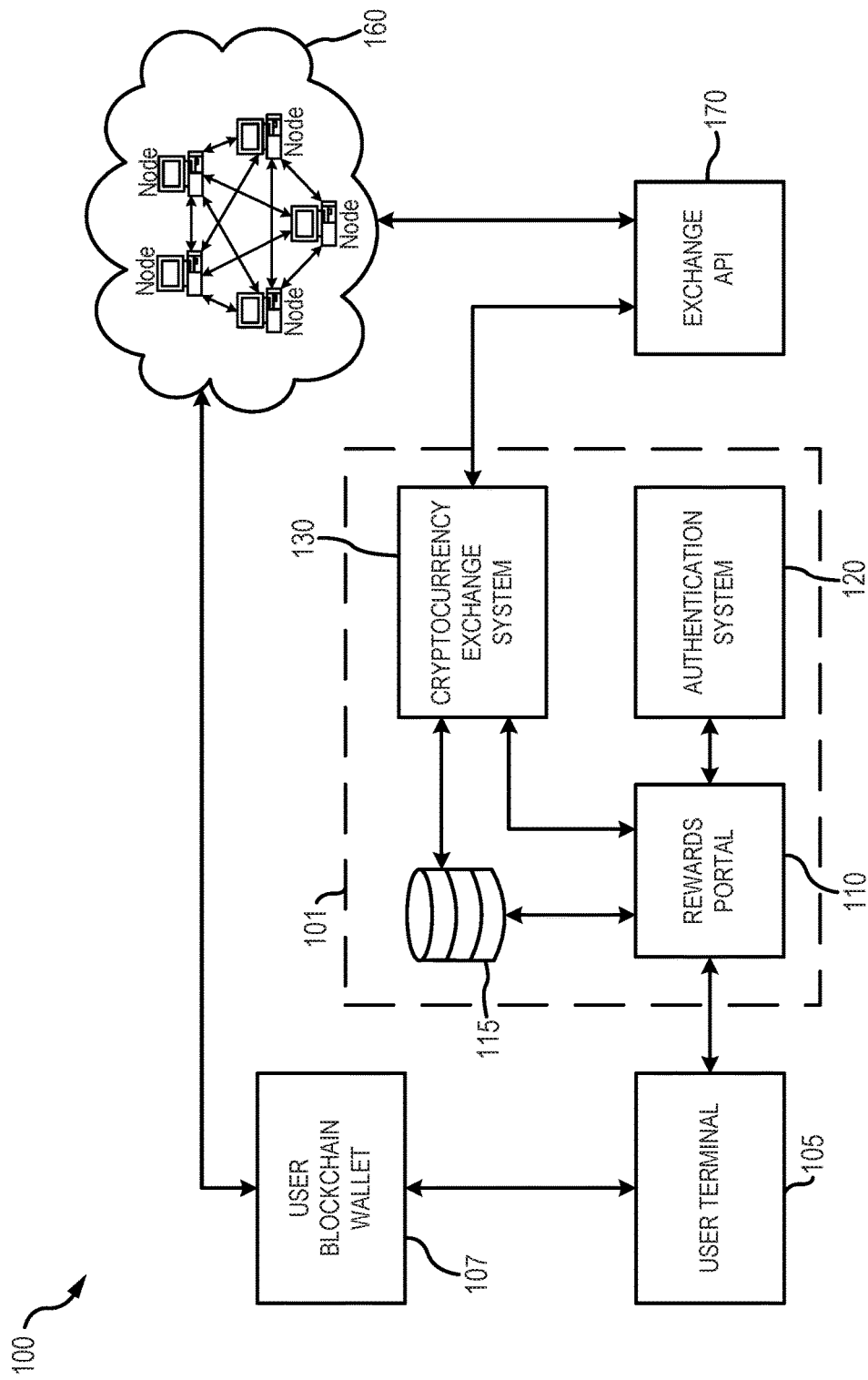
FIG. 1 is a block diagram illustrating an exemplary system for redeeming reward points for cryptocurrency, in accordance with various embodiments.

The detailed description of various embodiments refers to the accompanying drawings, which show various embodiments by way of illustration. While these various embodiments are described in sufficient detail to enable those skilled in the art to practice the disclosure, it should be understood that other embodiments may be realized and that logical and physical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The system may be used to facilitate the redemption of reward points for one or more cryptocurrencies. For example, the system may be used to exchange reward points for Bitcoin (BTC), Bitcoin Cash (BCC), Cardano (ADA), Dogecoin (DOGE), Ethereum (ETH), EOS (EOS), Dash (DASH), Litecoin (LTC), Monero (XMR), NEM (XEM), NEO (NEO), Ripple (XRP), Stellar (XLM), and/or any other current or future cryptocurrency type product. Users (e.g., loyalty program participants and/or transaction account holders) may register for reward point redemption for cryptocurrency using an authentication process. The authentication process may provide a higher level of security compared to typical account on-boarding authentication processes. Users may transmit cryptocurrency redemption requests to the system to initiate a reward points-to-cryptocurrency exchange, and to specify the amount of reward points to be exchanged, the cryptocurrency type the user desires to receive in return, and the user's blockchain wallet address to be used. The system may convert the reward points to a monetary value (e.g., a fiat currency) and interact with a cryptocurrency exchange API to purchase cryptocurrency based on the monetary value. The cryptocurrency exchange API may complete the purchase and write the purchase to a cryptocurrency blockchain network, according to the blockchain wallet address specified by the user.

Data transfers (e.g., cryptocurrency purchases, cryptocurrency transfers, etc.) performed through the cryptocurrency blockchain network may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times in the system may be improved compared to existing reward point exchanges. The system also offers increased security at least partially due to the immutable nature of data that is stored in the blockchain, reducing the probability of tampering with various data inputs and outputs. Therefore, by transmitting, storing, and accessing data using the processes described herein, the security of the data is improved, which decreases the risk of the computer or network from being compromised and may also decrease the risk of customer fraud found in reward point exchanges.

As used herein, "electronic communication" means communication of at least a portion of the electronic signals with physical coupling (e.g., "electrical communication" or "electrically coupled") and/or without physical coupling and via an electromagnetic field (e.g., "inductive communication" or "inductively coupled" or "inductive coupling"). As used herein, "transmit" may include sending at least a portion of the electronic data from one system component to another (e.g., over a network connection). Additionally, as used herein, "data," "information," or the like may include encompassing information such as commands, queries, files, messages, data for storage, and the like in digital or any other form.

With reference to FIG. 1, a system 100 for redeeming reward points for cryptocurrency is depicted according to various embodiments. System 100 may include various computing devices, software modules, networks, and data structures in communication with one another. System 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing. For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system. For example, and in accordance with various embodiments, the individual components of system 100 may be interconnected via a network.

As used herein, the term "network" may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which include, for example, a connection to an Internet Service Provider (ISP) over the local loop as is typically used in connection with standard modem communication, cable modem, DISH NETWORKS®, ISDN, Digital Subscriber Line (DSL), or various wireless communication methods. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

In various embodiments, system 100 may comprise a user terminal 105 in electronic communication with transaction network 101. User terminal 105 may comprise any suitable hardware, software, and/or database components capable of sending, receiving, and storing data. For example, user terminal 105 may comprise a personal computer, personal digital assistant, cellular phone, smartphone (e.g., IPHONE®, BLACKBERRY®, and/or the like), Internet of things (IoT) device, kiosk, and/or the like. User terminal 105 may comprise an operating system, such as, for example, a WINDOWS® mobile operating system, an ANDROID® operating system, APPLE® IOS®, a BLACKBERRY® operating system, and the like. User terminal 105 may comprise software components installed on user terminal 105 and configured to allow a user, via user terminal 105, access to a rewards portal 110 in transaction network 101. For example, user terminal 105 may comprise a web browser (e.g., MICROSOFT INTERNET EXPLORER®, GOOGLE CHROME®, etc.), an application, a micro-app or mobile application, or the like, configured to allow a user to access and interact with rewards portal 110.

In various embodiments, user terminal 105 may be in electronic and/or logical communication with a user blockchain wallet 107. User blockchain wallet 107 may be configured to allow the user, via user terminal 105, access to one or more cryptocurrency providers, platforms, or networks, to enable the user to make cryptocurrency transactions, store and maintain data regarding cryptocurrency balances and transactions, and store private keys for use with a cryptocurrency platform. For example, user blockchain wallet 107 may be in electronic communication with blockchain network 160, as discussed further herein. User blockchain wallet 107 may comprise a desktop wallet, a mobile wallet, a web wallet, or a hardware wallet. For example, user blockchain wallet 107 may comprise any suitable distributed-ledger based cryptocurrency wallet such as, for example, a wallet provided by Blockchain.info, COINBASE®, Electrum, Exodus, Jaxx, Ledger Wallet, Mist, MYETHERWALLET®, Robinhood Crypto, TREZOR®, and/or any other blockchain wallet. User blockchain wallet 107 may be assigned a blockchain address configured to function as a unique identifier for user blockchain wallet 107. For example, the blockchain address may comprise a public key from an asymmetric public/private key pair. The user may provide the public key to transaction network 101 to use when completing reward points redemptions to cryptocurrency.

In various embodiments, transaction network 101 may comprise or interact with a traditional account payment network to facilitate purchases and payments, authorize transactions, and/or settle transactions. For example, transaction network 101 may represent existing proprietary networks that presently accommodate transactions for credit cards, debit cards, and/or other types of transaction accounts or transaction instruments. Transaction network 101 may be a closed network that is secure from eavesdroppers. In various embodiments, transaction network 101 may comprise an exemplary transaction network such as AMERICAN EXPRESS®, VISANET®, MASTERCARD®, DISCOVER®, INTERAC®, Cartes Bancaires, JCB®, private networks (e.g., department store networks), and/or any other payment network. Transaction network 101 may include systems and databases related to financial and/or transaction systems and processes, such as, for example, one or more authorization engines, authentication engines and databases, settlement engines and databases, accounts receivable systems and databases, accounts payable systems and databases, and/or the like. For example, transaction network 101 may authorize and settle payment transactions; maintain transaction account member databases, accounts receivable databases, accounts payable databases, or the like; and issue reward points based on settled transactions (e.g., transaction account holders may earn a specified numbers of reward points based on the monetary value of each transaction, such as, for example, 1 reward point for each dollar of the transaction).

In various embodiments, transaction network 101 may comprise one or more network environments, servers, computer-based systems, processors, databases, and/or the like. In various embodiments, transaction network 101 may be computer based, and may comprise a processor, a tangible non-transitory computer-readable memory, and/or a network interface, along with other suitable system software and hardware components. Instructions stored on the tangible non-transitory memory may allow transaction network 101 to perform various functions, as described herein. In various embodiments, transaction network 101 may comprise one or more of a rewards portal 110, a rewards database 115, an authentication system 120, and/or a cryptocurrency exchange system 130. The rewards portal 110, rewards database 115, authentication system 120, and/or cryptocurrency exchange system 130, and any other components described herein may be in direct logical communication with each other via a bus, network, and/or through any other suitable means, or may be individually connected as described further herein.

In various embodiments, rewards portal 110 may be configured as a central hub to access various modules and databases of transaction network 101, as discussed further herein. A user, via user terminal 105, may access rewards portal 110 to view a user points balance, view reward point offers, or to use the reward points. For example, reward points may be used to pay for purchases, reimburse completed purchases, or book travel; redeemed for gift cards or other rewards; transferred to a rewards partner; redeemed for a cryptocurrency, as discusser further herein; and/or the like. Rewards portal 110 may comprise any suitable combination of hardware, software, databases, or the like. For example, rewards portal 110 may comprise a computer-based system, processor, or the like capable of receiving and transmitting data, performing various operations, and/or instructing various transaction network 101 components as discussed further herein. Rewards portal 110 may provide a user interface ("UI") accessible via user terminal 105. The UI may be accessible via a web browser (e.g., GOOGLE CHROME®, MICROSOFT INTERNET EXPLORER®, etc.), a mobile application (e.g., downloaded via APPLE® APP STORE®, GOOGLE PLAY®, etc.), or the like. The user, via user terminal 105 and the UI, may enter user credentials (e.g., a username and password, biometric input, etc.) to access rewards point data corresponding to the user (e.g., the user's transaction account) and redeem reward points.

In that regard, rewards portal 110 may be in electronic and/or logical communication with a rewards database 115. Rewards database 115 may comprise any suitable type of database, and may store, maintain, and retrieve data using any suitable technique described herein or known in the art. Rewards database 115 may be configured to store and maintain data regarding reward points such as, for example, a user points balance, a ledger of reward points earned, a ledger of reward points used, and the like. Rewards database 115 may also be configured to store and maintain data regarding user cryptocurrency registrations, such as, for example, user blockchain wallet addresses associated with user identifiers. Each data entry may comprise metadata, notes, tags, or the like indicating a user identifier (e.g., user name, transaction account number, etc.) associated with the data. Rewards portal 110 may be configured to retrieve and update data in rewards database 115, in response to changes in user reward points (e.g., reward points earned, reward points spent, redeemed, transferred, etc.), in response to receiving cryptocurrency registration data, or the like.

In various embodiments, authentication system 120 may be in electronic and/or logical communication with rewards portal 110. Authentication system 120 may also be in electronic communication with various internal data sources (e.g., transaction account owner databases, etc.), external data sources (e.g., Department of Motor Vehicles, address validation with United States Postal Service, utility providers, passport validation services, etc.), and/or any other consumer reporting agency, vendor, database, or system that provides information regarding consumers. Authentication system 120 may comprise any suitable combination of hardware, software, databases, or the like. For example, authentication system 120 may comprise a computer-based system, processor, or the like capable of receiving and transmitting data, performing various operations, and/or instructing various transaction network 101 components as discussed further herein.

Authentication system 120 may be configured to authenticate users desiring to redeem reward points for cryptocurrency. For example, authentication system 120 may be configured to perform an initial registration for users desiring to begin redeeming reward points for cryptocurrency, and/or may be configured to perform additional authentication steps during a reward points redemption for cryptocurrency. In various embodiments, the authentication may also be performed during a know your customer (KYC) evaluation, or the like. For example, authentication system 120 may be configured to prompt user terminal 105 to input user identification data, such as, a driver's license, identification card, passport, social security number (SSN), and/or any other identity-based data. Authentication system 120 may validate the user identification data using internal and/or external data sources. For example, authentication system 120 may validate the user identification data by querying LEXIS NEXIS®, the United States Post Office, utility providers, password validation services, and/or any other consumer reporting agency, vendor, database, or system that provides information regarding consumers and businesses. The internal and/or external data source may return whether the user identification data is accurate and valid.

In various embodiments, cryptocurrency exchange system 130 may be in electronic and/or logical communication with rewards portal 110, rewards database 115, and/or exchange API 170. Cryptocurrency exchange system 130 may comprise any suitable combination of hardware, software, databases, or the like. For example, cryptocurrency exchange system 130 may comprise a computer-based system, processor, or the like capable of receiving and transmitting data, performing various operations, and/or instructing various system 100 components as discussed further herein. Cryptocurrency exchange system 130 may be configured to receive and complete cryptocurrency redemption requests. For example, cryptocurrency exchange system 130 may be configured to receive a cryptocurrency redemption request, convert the user's reward points to a monetary value (e.g., a fiat currency value), determine the exchange API 170 needed to complete the exchange (e.g., based on the cryptocurrency type requested by the user), transmit a cryptocurrency purchase request to the exchange API 170, and store data regarding the completed transaction in rewards database 115, as discussed further herein.

Exchange API 170 (e.g., a cryptocurrency exchange API) may be configured to allow transaction network 101, via cryptocurrency exchange system 130, to buy, sell or exchange cryptocurrencies for other digital currency or traditional fiat currencies like the United States dollar, Euro, Rupee, or the like. Exchange API 170 may comprise a software interface configured to allow transaction network 101, via cryptocurrency exchange system 130, to buy, sell or exchange cryptocurrencies. For example, exchange API 170 may comprise a cryptocurrency exchange such as BITSTAMP®, BITSQUARE®, CEX.IO®, COINBASE®, Coinsquare, Gemini, Kraken, POLONIEX®, and/or any other desired cryptocurrency exchange. Although the present disclosure references exchange API 170, it should be understood that principles of the present disclosure may be applied to a system having any suitable number of cryptocurrency networks, exchange APIs, or the like interconnected to transaction network 101, and system 100 may be scaled to connect any suitable or desired number of exchange APIs.

In various embodiments, exchange API 170 may be in electronic communication with a blockchain network 160 (e.g., a cryptocurrency blockchain network) configured to store and maintain data regarding cryptocurrency transactions. For example, exchange API 170 may be configured to write data to a blockchain maintained on blockchain network 160 during the cryptocurrency redemption process. As discussed further herein, user blockchain wallet 107 may be in communication with blockchain network 160 to view and retrieve cryptocurrency transaction data, based on the blockchain wallet address associated with user blockchain wallet 107.

Blockchain network 160 may be a peer-to-peer network that is private, consortium and/or public in nature (e.g., ETHEREUM®, Bitcoin, HYPERLEDGER® Fabric, etc.). Consortium and private networks may offer improved control over the content of the blockchain and public networks may leverage the cumulative computing power of the network to improve security. In that regard, blockchain network 160 may be implemented using technologies such as, for example, Ethereum GETH, eth-lightwallet, or other suitable or future blockchain interface technologies. Blockchain network 160 may comprise various blockchain nodes (e.g., consensus participants) configured to maintain a blockchain. Each blockchain node may comprise a computing device configured to validate blocks of the blockchain. The computing devices may take the form of a computer or processor, or a set of computers and/or processors, although other types of computing units or systems may also be used. Each computing device may run applications to interact with blockchain network 160, communicate with other devices, perform crypto operations, and otherwise operate within system 100. Computing devices may run a client application that can be a thin client (web) based, hybrid (i.e. web and native, such as iOS and Android), or native application to make API calls to interact with the blockchain. The blockchain may be a distributed ledger implementing features and functionalities of blockchain in a readable manner and that is resistant to tampering. The blockchain may comprise a ledger of blocks that are interconnected by reference to the previous block. The blocks can hold cryptocurrency transfer data and/or other information as desired. Each block may link to the previous block and may include a timestamp. When implemented in support of the cryptocurrency platform, the blockchain may serve as an immutable log for cryptocurrency transactions.

Figure 2:
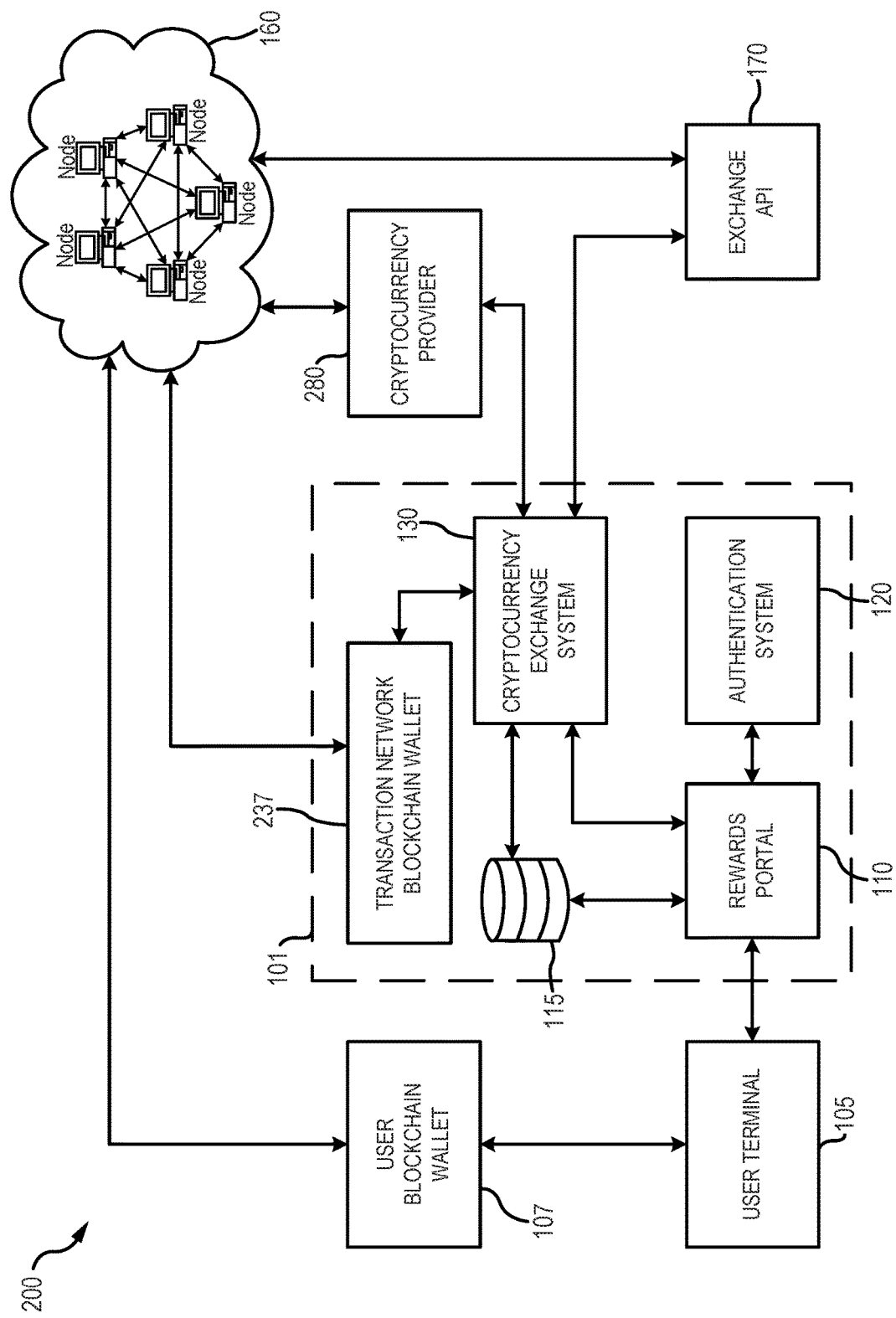
FIG. 2 is a block diagram illustrating an exemplary system for redeeming reward points for pre-purchased cryptocurrency using a cryptocurrency provider, in accordance with various embodiments.

With reference to FIG. 2, a system 200 for redeeming reward points for pre-purchased cryptocurrency using a cryptocurrency provider is depicted according to various embodiments. For example, transaction network 101 may complete an institutional bulk purchase of a cryptocurrency type prior to receiving the user's redemption request. In that regard, the pre-purchased cryptocurrency can be used to complete the user's redemption request.

Transaction network 101 may comprise a transaction network blockchain wallet 237 in electronic communication with cryptocurrency exchange system 130. In various embodiments, transaction network blockchain wallet 237 may be located within transaction network 101. In various embodiments, transaction network blockchain wallet 237 may also be located in cryptocurrency provider 280 and assigned to transaction network 101 during a registration process, purchase process, or the like. Transaction network blockchain wallet 237 may be configured to allow the transaction network 101 access to one or more cryptocurrency providers (e.g., cryptocurrency provider 280), platforms, or networks, to enable transaction network 101 to make cryptocurrency transactions, store and maintain data regarding cryptocurrency balances and transactions, and store private keys for use with a cryptocurrency platform. For example, transaction network blockchain wallet 237 may be in electronic communication with blockchain network 160, as discussed further herein. Transaction network blockchain wallet 237 may comprise a desktop wallet, a mobile wallet, a web wallet, or a hardware wallet. For example, transaction network blockchain wallet 237 may comprise any suitable distributed-ledger based cryptocurrency wallet such as, for example, a wallet provided by Blockchain.info, COINBASE®, Electrum, Exodus, Jaxx, Ledger Wallet, Mist, MYETHERWALLET®, Robinhood Crypto, TREZOR®, and/or any other blockchain wallet. Transaction network blockchain wallet 237 may be assigned a blockchain address configured to function as a unique identifier for transaction network blockchain wallet 237 and/or transaction network 101. For example, the blockchain address may comprise a public key from an asymmetric public/private key pair (e.g., a transaction network public key and a transaction network private key).

In various embodiments, cryptocurrency provider 280 may be configured to allow transaction network 101, via cryptocurrency exchange system 130, to pre-purchase cryptocurrency prior to receiving a reward points redemption request. Cryptocurrency provider 280 may provide any hardware, software, and or database configuration and may be in electronic communication with blockchain network 160 and/or cryptocurrency exchange system 130. For example, cryptocurrency provider 280 may comprise a provider of Bitcoin (BTC), Bitcoin Cash (BCC), Cardano (ADA), Dogecoin (DOGE), Ethereum (ETH), EOS (EOS), Dash (DASH), Litecoin (LTC), Monero (XMR), NEM (XEM), NEO (NEO), Ripple (XRP), Stellar (XLM), or any other suitable cryptocurrency type. Cryptocurrency provider 280 may comprise a software interface configured to allow transaction network 101, via cryptocurrency exchange system 130, to pre-purchase cryptocurrency. In response to transaction network 101 pre-purchasing cryptocurrency, cryptocurrency provider 280 may write the transaction data to blockchain network 160 (based on the transaction network public key), and transaction network blockchain wallet 237 may retrieve the transaction data to track the pre-purchased cryptocurrency transaction.

Figure 3:
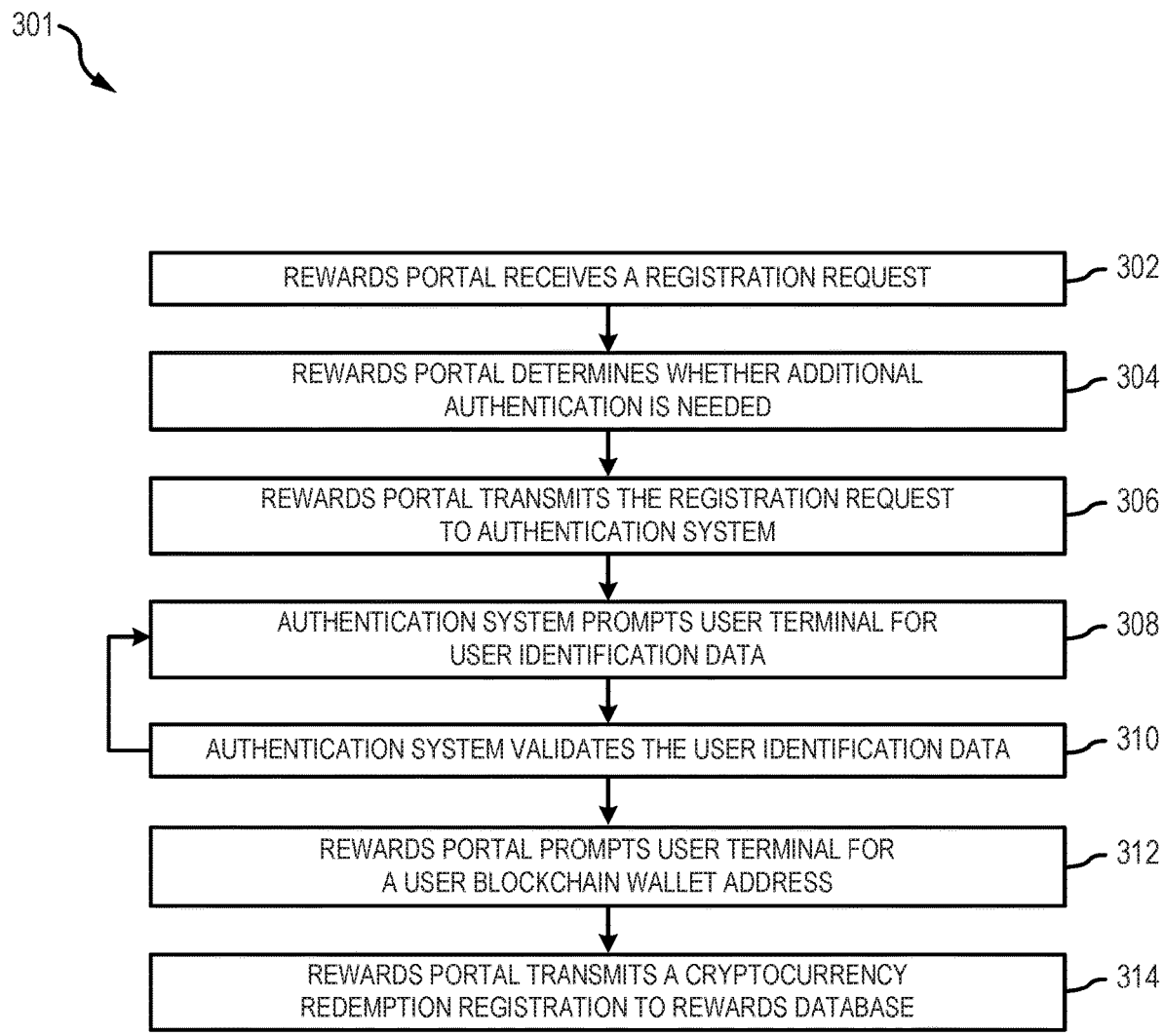
FIG. 3 illustrates a process flow for registering a user for reward points redemption for cryptocurrency, in accordance with various embodiments.
Figure 4:
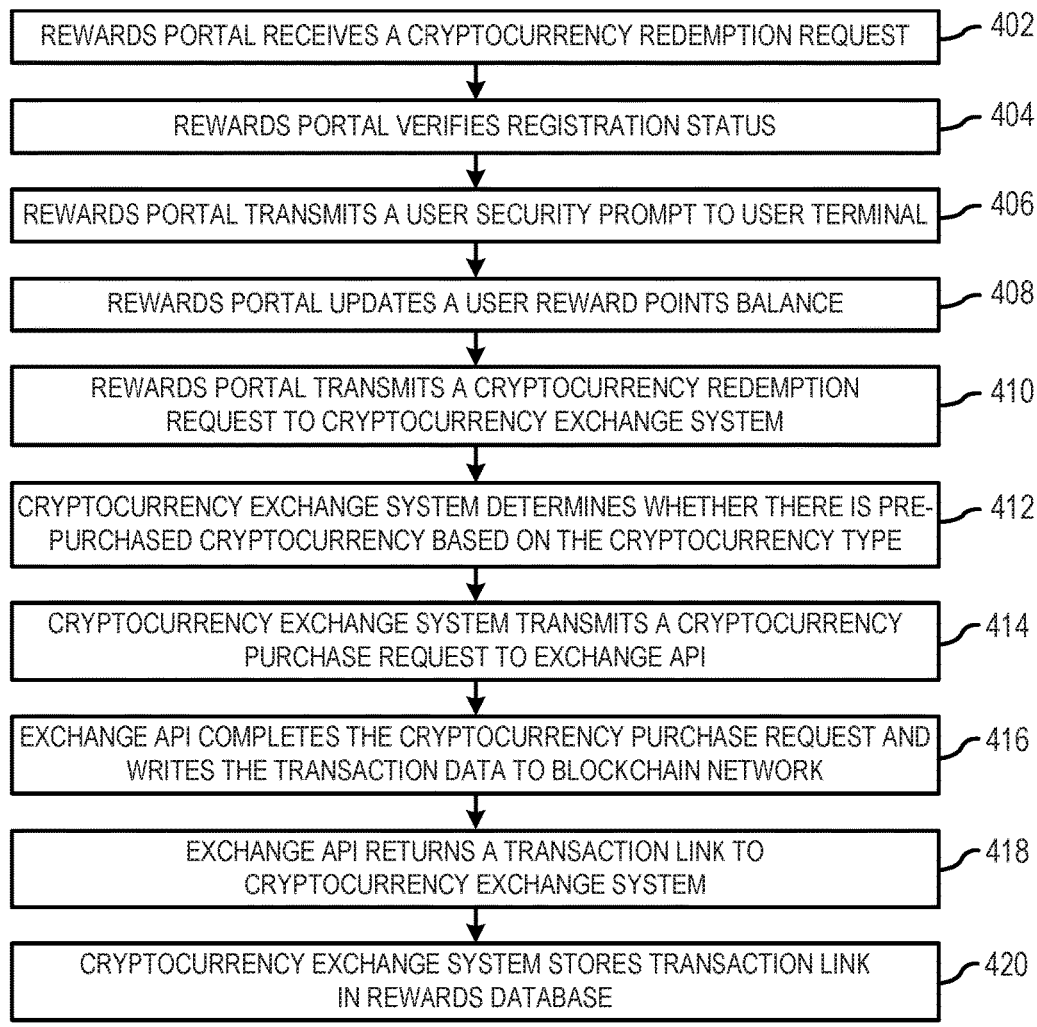
FIG. 4 illustrates a process flow for redeeming reward points for cryptocurrency, in accordance with various embodiments.

Referring now to FIGS. 3 and 4 the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIGS. 3 and 4, but also to the various system components as described above with reference to FIGS. 1 and 2.

With specific reference to FIG. 3, and continued reference to FIG. 1, a process 301 for registering for reward points redemption for cryptocurrency is disclosed. In various embodiments, users (e.g., transaction account holders, etc.) may register for reward points redemption for cryptocurrency before, during or after initiating a reward points redemption. Rewards portal 110 receives a registration request (step 302) to initiate registration for reward points redemption for cryptocurrency. Rewards portal 110 determines whether additional authentication is needed (step 304). Rewards portal 110 may determine whether a know your customer (KYC) evaluation or similar authentication evaluation was previously completed by the user. For example, during the initial setup of the transaction account, the user may complete an authentication evaluation including a KYC evaluation, a credit risk assessment, credit buy out (CBO) risk assessment, or the like. Rewards portal 110 may access internal data systems to determine whether additional authentication is needed to register the user for reward points redemption for cryptocurrency.

In response to determining that additional authentication is needed, rewards portal 110 transmits the registration request to authentication system 120 (step 306). Authentication system 120 prompts user terminal 105 for user identification data (step 308) via rewards portal 110. The user identification data may comprise any suitable identity-based data such as, for example, a driver's license, identification card, passport, social security number (SSN), or the like. Authentication system 120 validates the user identification data (step 310). Authentication system 120 may validate the user identification data using internal and/or external data sources. For example, authentication system 120 may validate the user identification data by querying LEXIS NEXIS®, NEUSTAR®, EXPERIAN®, EQUIFAX®, EMAILAGE®, TRANSUNION®, and/or any other consumer credit reporting agency, vendor, database, or system that provides information regarding consumers and businesses. The internal and/or external data source may return whether the user identification data is accurate and valid.

In response to determining that the user identification data is not accurate and/or not valid, authentication system 120 may prompt the user, via rewards portal 110, for additional user identification data and/or may transmit the registration request for a manual review of the application.

In various embodiments, in response to validating the user identification data, rewards portal 110 prompts user terminal 105 for a user blockchain wallet address (step 312). The user blockchain wallet address may correspond to user blockchain wallet 107, and may function as a cryptocurrency account number for the user (e.g., cryptocurrency received during reward points redemption is stored in the user blockchain wallet 107, as identified by the user blockchain wallet address). In various embodiments, rewards portal 110 may also provide external links to the user, via user terminal 105, to register for a blockchain wallet. Rewards portal 110 transmits a cryptocurrency redemption registration to rewards database 115 (step 314). The cryptocurrency redemption registration may comprise a user identifier (e.g., transaction account number, username, etc.) and the user blockchain wallet address.

With specific reference to FIG. 4, and continued reference to FIGS. 1 and 2, a process 401 for redeeming reward points for a cryptocurrency is disclosed. Rewards portal 110 receives a cryptocurrency redemption request (step 402) from user terminal 105. A user may interact with user terminal 105, via a mobile application, IoT communication, web browser, or the like, to access rewards portal 110. For example, the user may access rewards portal 110 to view a user reward points balance; to redeem reward points for travel, cash, gift cards, or the like; and/or to initiate a cryptocurrency redemption request to redeem reward points for a cryptocurrency. The cryptocurrency redemption request may comprise a user identifier (e.g., transaction account number, username, etc.), a reward points redemption amount, and a cryptocurrency type. The cryptocurrency type may comprise, for example, Bitcoin (BTC), Bitcoin Cash (BCC), Cardano (ADA), Dogecoin (DOGE), Ethereum (ETH), EOS (EOS), Dash (DASH), Litecoin (LTC), Monero (XMR), NEM (XEM), neo (NEO), Ripple (XRP), Stellar (XLM), and/or any other suitable type of cryptocurrency. In various embodiments, the cryptocurrency types available for cryptocurrency redemptions may be limited based on the user blockchain wallet 107 used by the user (e.g., blockchain wallets may not be compatible with all cryptocurrency types). In various embodiments, the blockchain address associated with the user blockchain wallet 107 may correspond to available cryptocurrency types such that rewards portal 110 may determine the available cryptocurrency types based on the blockchain address.

Rewards portal 110 verifies registration status (step 404). Rewards portal 110 may query rewards database 115 based on the user identifier to locate an associated cryptocurrency redemption registration to determine whether the user has registered for redeeming reward points for cryptocurrency. In response to being unable to locate an associated cryptocurrency redemption registration in rewards database 115, rewards portal 110 may prompt the user to proceed with registering for reward points redemption for cryptocurrency (e.g., process 301, with brief reference to FIG. 3).

In response to verifying that the user has registered, rewards portal 110 transmits a user security prompt to user terminal 105 (step 406). The user security prompt may be used as an extra layer of security to ensure that the user is authenticated, knows the risks of cryptocurrencies, and desires to proceed with the redemption. In various embodiments, the user security prompt may be a multi-factor authentication request. For example, if the user previously registered to allow for access to rewards portal 110 using a biometric input, the user security prompt may require the user to input the biometric input together with the user's password (e.g., a 2-factor authentication). As a further example, two-factor authentication may comprise sending an authentication number (e.g., a PIN, a code, a 6-digit number, etc.) via an established email address or mobile phone number (via SMS), and the user is prompted to input the authentication number before proceeding. In various embodiments, the user security prompt may also comprise a cryptocurrency warning. The cryptocurrency warning may display a message to the user, via user terminal 105, warning the user about the potential dangers investing in cryptocurrency (e.g., the value of a given cryptocurrency may be based on speculation, and may decrease in value at any time) and using a blockchain wallet (e.g., if the user loses the private key for the blockchain wallet, the user may lose all cryptocurrency contained therein). The user, via user terminal 105, may be required to affirmatively accept the cryptocurrency warning before proceeding with the transfer.

In various embodiments, rewards portal 110 updates a user reward points balance (step 408) in rewards database 115. Rewards portal 110 may query rewards database 115 based on the user identifier to determine and verify the user points balance associated with the user identifier. Rewards portal 110 may compare the user points balance to the reward points redemption amount to ensure that the user points balance is sufficient to complete the cryptocurrency redemption. Rewards portal 110 may update the user points balance to reflect the reward points redemption amount being transferred to the rewards partner (e.g., deduct the reward points redemption amount from the user points balance).

In various embodiments, rewards portal 110 transmits the cryptocurrency redemption request to cryptocurrency exchange system 130 (step 410). Cryptocurrency exchange system 130 may parse the cryptocurrency redemption request to determine the type of cryptocurrency the user desires to redeem the reward points for. In various embodiments, cryptocurrency may be pre-purchased by transaction network 101. For example, transaction network 101 may complete an institutional bulk purchase of a cryptocurrency type before receiving the user's request. In various embodiments, cryptocurrency exchange system 130 determines whether there is pre-purchased cryptocurrency based on the cryptocurrency type (step 412) input by the user. For example, cryptocurrency exchange system 130 may query transaction network blockchain wallet 237 to determine whether there is pre-purchased cryptocurrency matching the selected cryptocurrency type.

In various embodiments, cryptocurrency exchange system 130 transmits a cryptocurrency purchase request to exchange API 170 (step 414). Cryptocurrency exchange system 130 may select the exchange API to transmit the cryptocurrency purchase request based on the cryptocurrency type specified by the user (e.g., to ensure that the exchange API corresponds to a cryptocurrency type that the user desires to receive).

In response to determining in step 412 that there is pre-purchased cryptocurrency matching the specified cryptocurrency type, cryptocurrency exchange system 130 may transmit the cryptocurrency purchase request comprising the user blockchain wallet address and the transaction network blockchain wallet address. Cryptocurrency exchange system 130 may also calculate a pre-purchased cryptocurrency amount based on the reward points redemption amount. For example, one reward point may calculated as being one U.S. dollar, two U.S. dollars, etc. Based on the monetary value of the reward points redemption amount, cryptocurrency exchange system 130 may use the current market price of the cryptocurrency type to calculate the pre-purchased cryptocurrency amount.

In response to determining in step 412 that there is not pre-purchased cryptocurrency matching the specified cryptocurrency type, cryptocurrency exchange system 130 may transmit the cryptocurrency purchase request comprising a fiat currency value and the user blockchain wallet address. The fiat currency value may be calculated based on the reward points redemption amount. For example, one reward point is calculated as being one U.S. dollar, etc. The calculation may include the system also conducting any type of conversions of points, conversions of country currencies (or monetary values) related to the points or normalization of points, such that the points have similar or equivalent value in different systems. The system may also acquire updated country currency conversion rates or updated rewards program value, prior to converting the points. For example, 10 points in one system may be equivalent to 500 points in another system. The purchase request may also include a "loan" of points or cryptocurrencies to a second party, wherein the second party may eventually pay back the points or cryptocurrencies to the first party. The fiat currency value may be transferred from cryptocurrency exchange system 130 using an internal account in transaction network 101 (e.g., via a reward points to fiat currency settlement process).

Exchange API 170 completes the cryptocurrency purchase request and writes the transfer data to blockchain network 160 (step 416). In response to cryptocurrency exchange system 130 transmitting the cryptocurrency purchase request comprising the user blockchain wallet address and the transaction network blockchain wallet address (e.g., determining in step 412 that there is pre-purchased cryptocurrency matching the specified cryptocurrency type), exchange API 170 may complete the cryptocurrency purchase request by initiating a transfer of the pre-purchased cryptocurrency amount from the transaction network blockchain wallet address to the user blockchain wallet address. In response to cryptocurrency exchange system 130 transmitting the cryptocurrency purchase request comprising a fiat currency value and the user blockchain wallet address (e.g., determining in step 412 that there is not pre-purchased cryptocurrency matching the specified cryptocurrency type), exchange API 170 may complete the cryptocurrency purchase request by exchanging the fiat currency value for a cryptocurrency amount and transferring the cryptocurrency amount to the user blockchain wallet address.

Exchange API 170 may write the transaction data to the blockchain maintained by blockchain network 160. In response to successfully writing the transaction data to the blockchain, exchange API 170 generates a transaction link comprising a link to the transaction data on the blockchain, wherein the block comprises the transaction data of the completed cryptocurrency purchase request. In various embodiments, in response to exchange API 170 completing the cryptocurrency purchase, exchange API 170 returns the transaction link to cryptocurrency exchange system 130 (step 418).

In various embodiments, in response to the cryptocurrency redemption request being completed, cryptocurrency exchange system 130 stores the transaction link in rewards database 115 (step 420). Cryptocurrency exchange system 130 may store the transaction link as proof of the completed cryptocurrency redemption request. In that respect, a user may access rewards portal 110, via user terminal 105, to view completed cryptocurrency redemption requests and to access transaction links associated with each completed request.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward points, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The computer system (e.g., user terminal 105) or any components may integrate with system integration technology such as, for example, the ALEXA system developed by AMAZON®. ALEXA is a cloud-based voice service that can help you with tasks, entertainment, general information and more. All AMAZON® ALEXA devices, such as the AMAZON ECHO®, AMAZON ECHO DOT®, AMAZON TAP®, and AMAZON FIRE® TV, have access to the ALEXA system. The ALEXA system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The ALEXA system may allow the user to access information about eligible accounts linked to an online account across all ALEXA-enabled devices.

The phrases consumer, customer, user, account holder, account affiliate, cardmember or the like shall include any person, entity, business, government organization, business, software, hardware, machine associated with a transaction account, who buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, a FACEBOOK® message, a TWITTER® tweet, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, and in accordance with various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory or in-memory (non-spinning) hard drives. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data files transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEBSPHERE®, WEBLOGIC®, MOSS®, EDB® POSTGRES PLUS ADVANCED SERVER® (PPAS), etc.). In various embodiments, the server may include web servers (e.g. APACHE®, IIS, GWS, SUN JAVA® SYSTEM WEB SERVER, JAVA® Virtual Machine running on LINUX® or WINDOWS®).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

As those skilled in the art will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers Any databases discussed herein may include relational, hierarchical, graphical, blockchain, or object-oriented structure and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MySQL by MySQL AB (Uppsala, Sweden), MONGODB®, REDIS®, APACHE CASSANDRA®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. For more information on blockchain-based payment networks, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, and U.S. application Ser. No. 15/785,870 titled API REQUEST AND RESPONSE BALANCING AND CONTROL ON BLOCKCHAIN and filed on Oct. 17, 2017, the contents of which are each incorporated by reference in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set: e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPE"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT®, active server pages (ASP), common gateway interface scripts (CGI), extensible markup language (XML), dynamic HTML, cascading style sheets (CSS), AJAX (Asynchronous JAVASCRIPT® And XML), helper applications, plug-ins, and the like. A server may include a web service that receives a request from a web server, the request including a URL and an IP address (e.g., 10.0.0.2). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE® MQTM (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIGS. 3 and 4, the process flows and screenshots depicted are merely embodiments and are not intended to limit the scope of the disclosure. For example, the steps recited in any of the method or process descriptions may be executed in any order and are not limited to the order presented.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in*In re Nuijten* to fall outside the scope of patentable subject matter under 35 U.S.C. § 101.

The disclosure and claims do not describe only a particular outcome of transferring reward points, but the disclosure and claims include specific rules for implementing the outcome of transferring reward points and that render information into a specific format that is then used and applied to create the desired results of transferring reward points, as set forth in *McRO, Inc. v. Bandai Namco Games America Inc.* (Fed. Cir. case number 15-1080, Sep. 13, 2016). In other words, the outcome of transferring reward points can be performed by many different types of rules and combinations of rules, and this disclosure includes various embodiments with specific rules. While the absence of complete preemption may not guarantee that a claim is eligible, the disclosure does not sufficiently preempt the field of transferring reward points at all. The disclosure acts to narrow, confine, and otherwise tie down the disclosure so as not to cover the general abstract idea of just transferring reward points. Significantly, other systems and methods exist for transferring reward points, so it would be inappropriate to assert that the claimed invention preempts the field or monopolizes the basic tools of transferring reward points. In other words, the disclosure will not prevent others from transferring reward points, because other systems are already performing the functionality in different ways than the claimed invention. Moreover, the claimed invention includes an inventive concept that may be found in the non-conventional and non-generic arrangement of known, conventional pieces, in conformance with *Bascom* v. *AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the systems and methods may include a graphical user interface for dynamically relocating/rescaling obscured textual information of an underlying window to become automatically viewable to the user (via user terminal 105). By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email, reward transfer messages, reward transfer response messages, etc.) to prevent a computer or network from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims.

Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
    verifying, by the at least one computing device, that a user account associated with a cryptocurrency redemption request received from a client device is registered in a cryptocurrency rewards program based at least in part on a query of a rewards database using a user identifier, the cryptocurrency redemption request comprising the user identifier, a rewards point redemption amount, and a cryptocurrency type;
    retrieving, by the at least one computing device, a user blockchain wallet address associated with the user identifier from the rewards database, the user blockchain wallet address identifying one or more available cryptocurrency types associated with a user blockchain wallet of a user account;
    determining, by the at least one computing device, and based at least in part on the cryptocurrency type, a cryptocurrency exchange API required to complete an exchange of reward points for cryptocurrency;
    transmitting, by the at least one computing device in electronic communication with the cryptocurrency exchange API, a cryptocurrency purchase request for exchanging the rewards points for the cryptocurrency, the cryptocurrency purchase request comprising the user blockchain wallet address; and
    receiving, by the at least one computing device and from the cryptocurrency exchange API, a transaction link generated by the cryptocurrency exchange API in response to the cryptocurrency exchange API completing the cryptocurrency purchase request to exchange the rewards points for the cryptocurrency,
    wherein the cryptocurrency exchange API is configured to complete the cryptocurrency purchase request by writing transaction data to a blockchain, and
    wherein the transaction link comprises a link to the transaction data on the blockchain comprising the transaction data of the completed cryptocurrency purchase request.

2. The method of claim 1, wherein the cryptocurrency purchase request comprises a fiat currency value based on the reward points redemption amount, and
    wherein the cryptocurrency exchange API is configured to complete the cryptocurrency purchase request by exchanging the fiat currency value for a cryptocurrency amount.

3. The method of claim 1, wherein the cryptocurrency purchase request comprises a transaction network blockchain wallet address, and
    wherein the cryptocurrency exchange API is configured to complete the cryptocurrency purchase request by transferring a pre-purchased cryptocurrency amount from the transaction network blockchain wallet address to the user blockchain wallet address, wherein the pre-purchased cryptocurrency amount is based on the reward points redemption amount.

4. The method of claim 1, further comprising storing, by the at least one computing device, the transaction link in the rewards database as proof of the completed cryptocurrency purchase request.

5. The method of claim 1, further comprising transmitting, by the at least one computing device in electronic communication with a user terminal, a user security prompt in response to receiving the cryptocurrency redemption request.

6. The method of claim 5, wherein the user security prompt comprises a cryptocurrency warning describing one or more risks of using cryptocurrency.

7. The method of claim 1, further comprising:
    receiving, by the at least one computing device, a cryptocurrency redemption registration request;
    transmitting, by the at least one computing device in electronic communication with a user terminal, a user identification data request comprising a prompt to input identity-based data;
    authenticating, by the at least one computing device, a user identification data response by validating data received from the user terminal in response to the user identification data request; and
    receiving, by the at least one computing device and via the user terminal, the user blockchain wallet address to complete the cryptocurrency redemption registration request.

8. A computer-based system for redeeming reward points for cryptocurrency, comprising:
    at least one computing device comprising a processor and a memory; and
    machine instructions stored in the memory, and when executed by the processor, cause the at least one computing device to perform operations comprising:
        verifying that a user account associated with a cryptocurrency redemption request received from a client device is registered in a cryptocurrency rewards program based at least in part on a query of a rewards database using a user identifier, the cryptocurrency redemption request comprising the user identifier, a rewards point redemption amount, and a cryptocurrency type;
        retrieving a user blockchain wallet address associated with the user identifier from the rewards database, the user blockchain wallet address identifying one or more available cryptocurrency types associated with a user blockchain wallet of a user account;
        determining, based at least in part on the cryptocurrency type, a cryptocurrency exchange API required to complete an exchange of reward points for cryptocurrency;
        transmitting a cryptocurrency purchase request to the cryptocurrency exchange API, the cryptocurrency purchase request being for exchanging the rewards points for the cryptocurrency, and the cryptocurrency purchase request comprising the user blockchain wallet address; and
        receiving, from the cryptocurrency exchange API, a transaction link generated by the cryptocurrency exchange API in response to the cryptocurrency exchange API completing the cryptocurrency purchase request to exchange the rewards points for the cryptocurrency, wherein the cryptocurrency exchange API is configured to complete the cryptocurrency purchase request by writing transaction data to a blockchain, and wherein the transaction link comprises a link to the transaction data on the blockchain comprising the transaction data of the completed cryptocurrency purchase request.

9. The computer-based system of claim 8, wherein the cryptocurrency purchase request comprises a fiat currency value based on the reward points redemption amount, and wherein the cryptocurrency exchange API is configured to complete the cryptocurrency purchase request by exchanging the fiat currency value for a cryptocurrency amount.

10. The computer-based system of claim 8, wherein the cryptocurrency purchase request comprises a transaction network blockchain wallet address, and wherein the cryptocurrency exchange API is configured to complete the cryptocurrency purchase request by transferring a pre-purchased cryptocurrency amount from the transaction network blockchain wallet address to the user blockchain wallet address, wherein the pre-purchased cryptocurrency amount is based on the reward points redemption amount.

11. The computer-based system of claim 8, wherein, when executed, the machine-readable instructions further cause the at least one computing device to perform operations comprising storing the transaction link in the rewards database as proof of the completed cryptocurrency purchase request.

12. The computer-based system of claim 8, wherein, when executed, the machine-readable instructions further cause the at least one computing device to perform operations comprising transmitting a user security prompt to a user terminal in response to receiving the cryptocurrency redemption request.

13. The computer-based system of claim 12, wherein the user security prompt comprises a cryptocurrency warning describing one or more risks of using cryptocurrency.

14. The computer-based system of claim 8, wherein, when executed, the machine-readable instructions further cause the at least one computing device to perform operations comprising:
receiving a cryptocurrency redemption registration request from the client device;
transmitting a user identification data request to a user terminal of a client device, the user identification data request comprising a prompt to input identity-based data;
authenticating a user identification data response by validating data received from the user terminal in response to the user identification data request; and
receiving, via the user terminal, the user blockchain wallet address to complete the cryptocurrency redemption registration request.

15. An article of manufacture including a non-transitory, tangible computer readable storage medium having instructions stored thereon that, in response to execution by at least one computing device, cause the at least one computing device to perform operations comprising:
verifying that a user account associated with a cryptocurrency redemption request received from a client device is registered in a cryptocurrency rewards program based at least in part on a query of a rewards database using a user identifier, the cryptocurrency redemption request comprising the user identifier, a rewards point redemption amount, and a cryptocurrency type;
retrieving a user blockchain wallet address associated with the user identifier from the rewards database, the user blockchain wallet address identifying one or more available cryptocurrency types associated with a user blockchain wallet of a user account;
determining, based at least in part on the cryptocurrency type, a cryptocurrency exchange API required to complete an exchange of reward points for cryptocurrency;
transmitting a cryptocurrency purchase request to the cryptocurrency exchange API, the cryptocurrency purchase request being for exchanging the rewards points for the cryptocurrency, and the cryptocurrency purchase request comprising the user blockchain wallet address; and
receiving, from the cryptocurrency exchange API, a transaction link generated by the cryptocurrency exchange API in response to the cryptocurrency exchange API completing the cryptocurrency purchase request to exchange the rewards points for the cryptocurrency,
wherein the cryptocurrency exchange API is configured to complete the cryptocurrency purchase request by writing transaction data to a blockchain, and
wherein the transaction link comprises a link to the transaction data on the blockchain comprising the transaction data of the completed cryptocurrency purchase request.

16. The article of manufacture of claim 15, wherein the cryptocurrency purchase request comprises a fiat currency value based on the reward points redemption amount, and
wherein the cryptocurrency exchange API is configured to complete the cryptocurrency purchase request by exchanging the fiat currency value for a cryptocurrency amount.

17. The article of manufacture of claim 15, wherein the cryptocurrency purchase request comprises a transaction network blockchain wallet address, and
wherein the cryptocurrency exchange API is configured to complete the cryptocurrency purchase request by transferring a pre-purchased cryptocurrency amount from the transaction network blockchain wallet address to the user blockchain wallet address, wherein the pre-purchased cryptocurrency amount is based on the reward points redemption amount.

18. The article of manufacture of claim 15, wherein, when executed, the instructions further cause the at least one computing device to perform operations comprising storing the transaction link in the rewards database as proof of the completed cryptocurrency purchase request.

19. The article of manufacture of claim 15, wherein, when executed, the instructions further cause the at least one computing device to perform operations comprising transmitting, a cryptocurrency warning to a user terminal of a client device in response to receiving the cryptocurrency redemption request, wherein the cryptocurrency warning describes one or more dangers associated with using cryptocurrency.

20. The article of manufacture of claim 15, wherein, when executed, the instructions further cause the at least one computing device to perform operations comprising:
receiving a cryptocurrency redemption registration request;

transmitting a user identification data request to a user terminal of the client device, the user identification data request comprising a prompt to input identity-based data;
authenticating a user identification data response by validating data received from the user terminal in response to the user identification data request; and
receiving, via the user terminal, the user blockchain wallet address to complete the cryptocurrency redemption registration request.

* * * * *